United States Patent Office 2,882,975
Patented Apr. 21, 1959

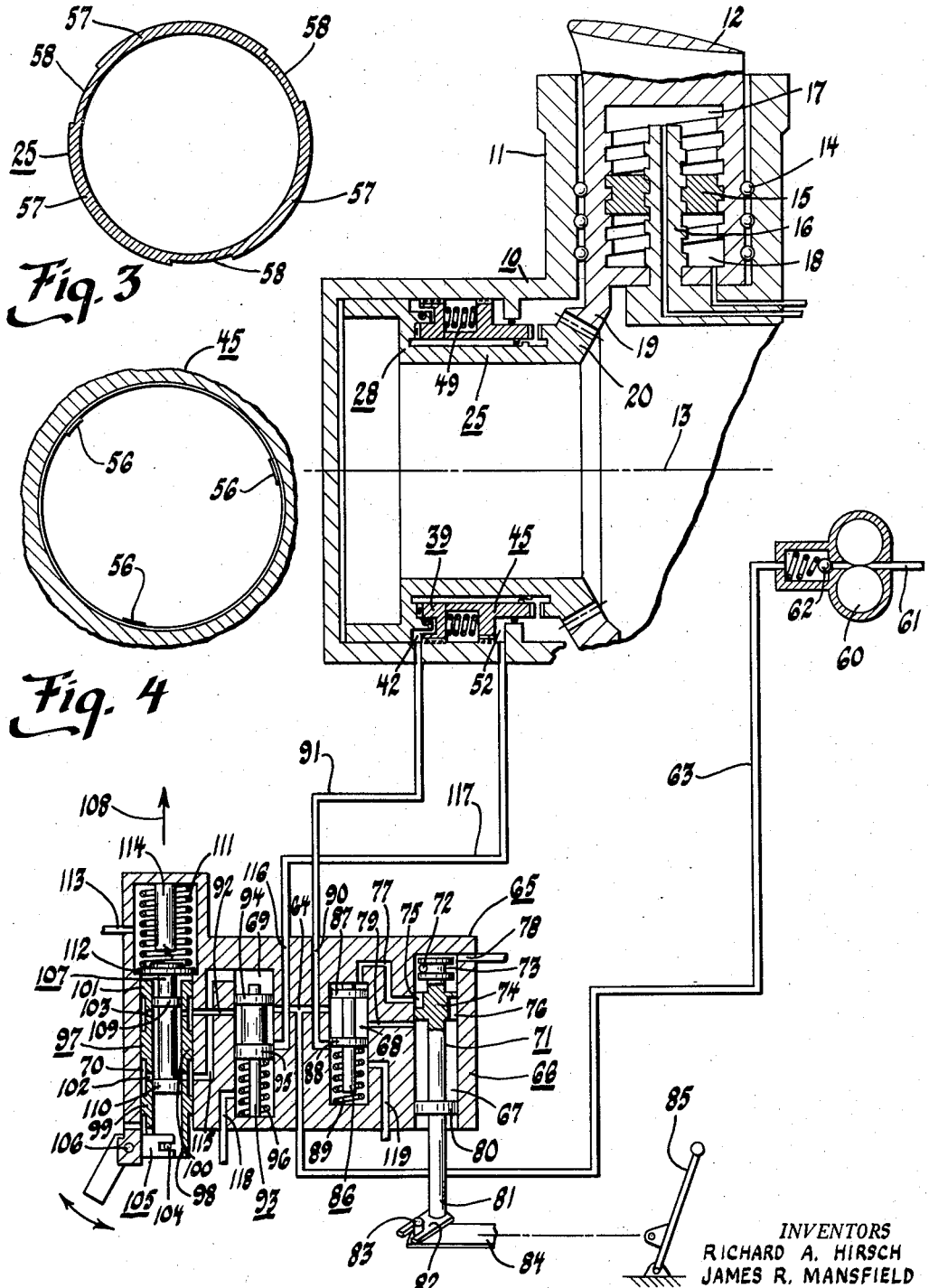

2,882,975

PROPELLER MECHANICAL PITCH LOCK AND LOW PITCH STOP ASSEMBLY

Richard A. Hirsch, West Milton, and James R. Mansfield and Harry N. Nelson, Troy, Ohio, assignors to General Motors Corporation, Detroit, Mich., a corporation of Delaware Application March 14, 1956, Serial No. 571,523

16 Claims. (Cl. 170—160.32)

This invention pertains to variable pitch propellers, and particularly to an improved combined mechanical pitch lock and low pitch stop assembly for variable pitch propellers.

Heretofore, it has been proposed to incorporate independent mechanical pitch lock and low pitch stop mechanisms in a variable pitch propeller of the type having an independent motor for adjusting the pitch position of each propeller blade, the pitch positions of the several propeller blades being coordinated by a master gear. A mechanical pitch lock mechanism designed for this type of propeller is disclosed in copending application Serial No. 545,033, Flaugh, et al., and a mechanical low pitch stop mechanism is disclosed in copending application Serial No. 545,034, Flaugh, et al., both filed on November 4, 1955, and assigned to the assignee of this invention. This invention relates to an improved and simplified combined assembly for performing the two independent functions of the separate mechanisms of the aforementioned applications. Accordingly, among our objects are the provision of a combined mechanical pitch lock and pitch stop assembly for a variable pitch assembly; the further provision of an assembly including a pitch lock element and a pitch stop element which are biased to operative positions by common resilient means; and the still further provision of a combined pitch lock and pitch stop assembly including independent piston means responsive to pressure fluid for moving a pitch lock element and a pitch stop element to inoperative positions.

The aforementioned and other objects are accomplished in the present invention by interposing a plurality of coil springs between annular pitch lock and pitch stop elements for moving the elements in opposite directions to operative positions. Specifically, the combined mechanical pitch lock and low pitch stop assembly is designed for a propeller of the general type disclosed in copending applications Serial Nos. 485,921, Ditmer, et al., and 485,922, Brandes, et al., both filed February 3, 1955, and assigned to the assignee of this invention. Thus, the propeller is of the type including an independent hydraulic motor for adjusting the pitch position of each propeller blade. Pitch changing movements of the several propeller blades are coordinated by a master gear and the servomotors are controlled by governor valve means disposed within a regulator rotatable with the propeller. The valve means are operable to direct pressure fluid from a source energized incident to propeller rotation so as to maintain propeller speed substantially constant by either increasing or decreasing the pitch position of the propeller blades.

In the improved combined mechanical pitch lock and stop assembly, the master gear is connected by straight splines to a sleeve coaxial with the horizontal propeller axis. The outboard end of the sleeve has a straight spline connection with an annulus having a plurality of circumferentially spaced jaws extending axially therefrom. Thus, the master gear, which rotates relative to the propeller hub during pitch changing movements of the propeller blades effects a like movement of the sleeve and the annulus. The annulus constitutes the rotatable element of the mechanical low pitch stop which is rotated in accordance with the pitch position of the propeller blades. The master gear constitutes an element of the mechanical pitch lock which is rotated during pitch changing movements of the propeller blades. The unitary assembly also includes a pitch stop element restrained against rotation relative to the propeller hub and a pitch lock element, likewise, restrained against rotation relative to the hub. Both of the latter elements, however, being capable of axial movement relative to the propeller hub into engagement or out of engagement with its cooperating element.

The axially movable pitch stop element, likewise, has a plurality of circumferentially spaced jaws and a piston surface which is responsive to pressure fluid in a servo chamber for moving the axially movable pitch stop element out of engagement with the rotatable pitch stop element. Similarly, the axially movable pitch lock element includes a piston surface responsive to pressure fluid in a servo chamber for moving this element axially out of engagement with its cooperating pitch lock element constituted by the master gear. The pitch locking elements are formed with complementary ratchet toothed surfaces which, when engaged, prevent movement of the blades in a pitch decreasing direction although permitting movement of the blades in a pitch increasing direction.

The axially movable pitch stop element and the axially movable pitch lock element both have a straight splined connection with an annulus attached to the propeller hub. Moreover, the axially movable pitch lock element is formed with a plurality of circumferentially spaced spring cavities within which a plurality of coiled compression springs are disposed. The inboard ends of the coiled compression springs engage the axially movable pitch lock element while the outboard ends of the compression springs engage the axially movable pitch stop element. Thus, in the combined assembly of this invention, both the mechanical pitch lock and the mechanical low pitch stop elements are moved to operative positions by common resilient means. Moreover, if desired, the jaws on the pitch stop elements can be formed with ramp surfaces which positively disengage the stop elements when the propeller blades are moved to the feathered position, as is disclosed in aforementioned copending application Serial No. 545,034.

During propeller operation in the constant speed range, the mechanical low pitch stop elements are engaged so as to prevent movement of the propeller blades in a decrease pitch direction below a predetermined low blade angle, for instance, a positive 18°. However, when it is desired to move the propeller blades into the manual blade angle control range, or beta, or to a full reverse angle position, pressure fluid is supplied to the pitch stop relief servo chamber so as to move the axially movable pitch stop element to an inoperative position. On the other hand, during propeller operation in all ranges, including the constant speed range, feathering, beta or reverse, the pitch lock is disengaged by applying pressure fluid to the pitch lock release servo chamber. Engagement between the pitch lock elements is controlled by a speed sensitive valve which is calibrated to respond to a predetermined overspeed, for instance, 5% above the governor speed setting in the constant speed range to actuate a servo valve which will then connect the pitch lock release servo chamber to drain permitting the resilient means to engage the pitch lock and prevent movement of the propeller blades in the pitch decrease direction.

Further objects and advantages of the present invention will be apparent from the following description, reference being had to the accompanying drawings wherein a preferred embodiment of the present invention is clearly shown.

In the drawings:

Fig. 2 is a schematic diagram of simplified fluid pressure system for controlling the unitary pitch lock and pitch stop assembly of this invention.

Figure 1:
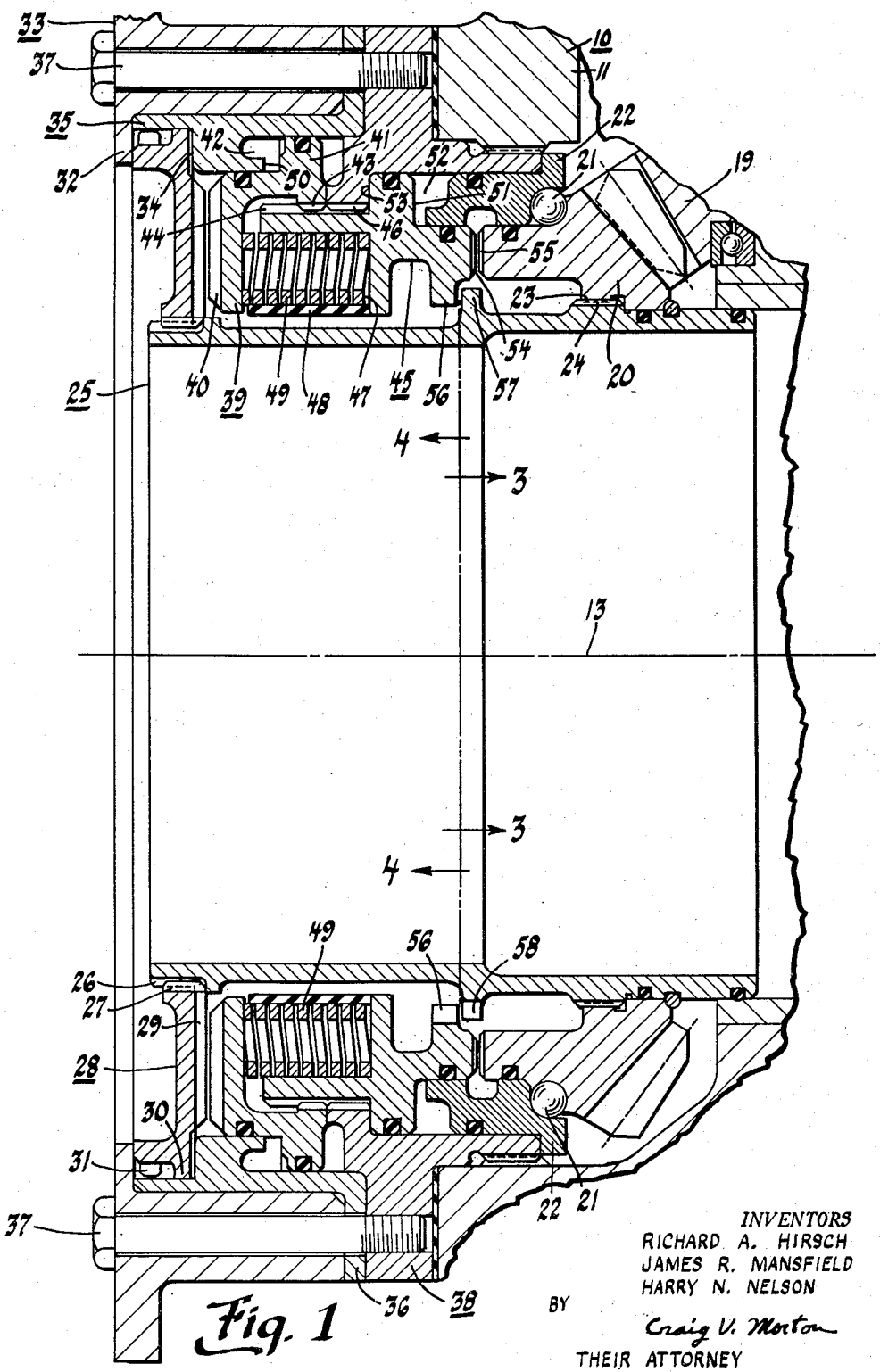
Fig. 1 is a fragmentary view, partly in section and partly in elevation, of the unitary pitch lock and pitch stop assembly of this invention.

Figs. 3 and 4 are reduced sectional views taken along lines 3—3 and 4—4, respectively, of Fig. 1.

With particular reference to the drawings, the unitary mechanical low pitch stop and low pitch lock assembly is disclosed in conjunction with a variable pitch propeller having a hub 10 having a plurality of radially extending sockets 11 within which propeller blades 12 are journaled for rotation about their longitudinal axes. The propeller hub 10 is drivingly connected to an engine driven shaft, not shown, the horizontal propeller axis being indicated by numeral 13. As schematically shown in Fig. 2, each propeller blade 12 is journaled for rotation in a hub socket 11 by a combined radial and thrust stack bearing assembly 14.

The root of each blade 12 encloses its own pitch changing motor, schematically shown in Fig. 2, which structurally may be of the type shown in the Martin, et al., Patent 2,500,692. Schematically, this torque unit is shown as including a piston 15 having internal and external helically splined surfaces, the internal helically splined surface engages a fixed helical splined member 16, and the external helical splines of which engage helical splines formed on the interior of the blade root. The piston 15 is capable of fluid pressure actuation in both directions and movement of the piston 15 in either direction effects rotation of the blade 12 about its longitudinal axis. The piston 15 divides the torque unit cylinder into a decrease pitch chamber 17 and an increase pitch chamber 18. In addition, the blade 12 is shown schematically as having an integral bevel gear sector 19, which meshes with a master gear 20 journaled for rotation relative to the hub 10 about the axis 13.

With particular reference to Fig. 1, structurally the master gear 20, which coordinates the pitch changing movements of all of the propeller blades, is journaled for rotation relative to the hub by ball bearing means 21, the inner race of the bearing means 21 being integral with the master gear, and the outer race being constituted by an annular member 22. The master gear 20 is formed with a set of straight splines 23, which mate with a complementary set of straight splines 24 on a sleeve 25, which extends axially outboard of the master gear 20. Since the master gear is rotated during pitch changing movements of the propeller blades, and, thus, has a definite angular position relative to the hub for every pitch position of the propeller blades, the sleeve 25 will, likewise, be rotated about the axis 13 during pitch changing movements of the propeller blades. The external periphery of the sleeve 25 adjacent the outboard end thereof is formed with a set of straight spline teeth 26, which are engaged by a complementary set of straight spline teeth 27 formed on an annular pitch stop element 28. Thus, the pitch stop element 28, likewise, has a definite angular position for every pitch poistion of the propeller blades.

The rotatable pitch lock element 28 is formed with a plurality of circumferentially spaced, axially extending jaws 29, which are of the type disclosed in the aforementioned application Serial No. 545,034. In addition, the element 28 is formed with axially spaced flanges 30 and 31, flange 31 being partially toothed and constituting a feedback gear of the type disclosed in co-pending application Serial No. 289,110, filed May 21, 1952, now U.S. Patent No. 2,761,519, in the name of Richard A. Hirsch, and assigned to the assignee of this invention.

The element 28 is restrained against axial movement relative to the propeller hub 10 by reason of being disposed between a flange 32 of a ring 33 and an inwardly extending shoulder 34 of a sleeve member 35. The sleeve member 35 is also formed with a radially extending flange portion 36 having a plurality of holes therethrough which receive bolts 37. The bolts 37 are used to attach the annular member 33 and the sleeve 35 to a second annular member 38. In addition, the members 33, 35 and 38 are rigidly secured to the hub 10 by a plurality of through bolts, not shown, in a manner similar to that disclosed in the aforementioned copending applications Serial Nos. 545,033 and 545,034.

An axially movable pitch stop element 39 having a complementary set of circumferentially spaced axially extending jaws 40 has an annular piston surface 41, which sealingly engages the sleeve member 35, a servo chamber 42 is formed between the piston means 41 and the sleeve member 35. The axially movable pitch stop element 39 is formed with a set of straight spline teeth 43, which mate with a set of straight spline teeth 44 formed on an annular, axially movable pitch lock element 45. The pitch lock element 45 is restrained against rotation relative to the hub 10 since the annular member 38 has a set of straight spline teeth 46 mating with the straight spline teeth 44, the member 38 being rigidly attached to the hub, as aforementioned. Thus, the axially movable pitch stop element 39 is restrained against rotation relative to the hub 10. The axially movable pitch stop element 39 is shown in the disengaged position, which position it assumes when pressure fluid is supplied to the servo chamber 42 so as to move the element 39 into engagement with the member 38. In the position depicted in Fig. 1, the jaws 40 will not engage the complementary jaws 29 on the pitch stop element 28, which is located angularly in accordance with the pitch position of the propeller blades.

The axially movable pitch lock element 45 is formed with a plurality of circumferentially spaced spring cavities 47, the inner surfaces of which are formed by an annulus 48 attached to the element 45. A plurality of coiled compression springs 49 are disposed within the cavities 47, the outboard ends of the springs 49 engaging the pitch stop element 39, and the inboard ends of the springs 49 engaging the pitch lock element 45. Thus, in the absence of pressure fluid in the pitch stop releasing servo chamber 42, the springs 49 will move the element 39 axially to the left, as viewed in Fig. 1, so that the piston means 41 engages flange 50 of the sleeve member 35 and the jaws 40 are in an operative position to positively prevent movement of the propeller blades below a selected low pitch angle, for instance, a positive 18°.

The axially movable pitch lock element 45 has an annular piston surface 51, which sealingly engages a portion of the annular member 38. A servo chamber 52 is formed by the piston means 51, the member 38 and the race 22 of the bearing means 21. When pressure fluid is applied to the pitch lock release servo chamber 52, the pitch lock element 45 will move to the position of Fig. 1 wherein the piston means 51 engages flange 53 of the annular member 38. The pitch lock element 45 is formed with a circumferentially spaced set of ratchet teeth 54 which are engageable with a complementary set of ratchet teeth 55 formed on an axially extending portion of the master gear 20. The ratchet teeth 54 and 55 are designed, when engaged, to prevent rotation of the master gear 20 about the axis 13 in the pitch decreasing direction of the propeller blades while permitting rotation of the master gear 20 about the axis 13 in a pitch increasing direction.

As seen in Figs. 1 and 4, the pitch lock element 45 is formed with three circumferentialy spaced lugs 56. Since the element 45 is restrained against rotation relative to the hub 10, the lugs 56 will have a fixed angular position relative to the hub. The sleeve 25, as seen in Figs. 1 and 3, has a radially outward extending flange 57 having three circumferentially spaced arcuate cutout portions 58, the arcuate distance of the cutout portions 58 being equal to the angular movement imparted to the master gear 20 and the sleeve 25 during propeller operation in the constant speed range. The arrangement of the lugs 56 on the pitch lock element 45 and the arcuate grooves 58 in the sleeve 25 is such that when the propeller blades are in the governing, or constant speed, range between the mechanical low pitch stop angle and the maximum positive governing angle, the lugs 56 will be aligned with the cutout portions 58. In this manner, when the servo releasing chamber 52 is connected to drain, the springs 49 reacting against the member 45 will move the pitch lock element 45 axially to the right, as viewed in Fig. 1, so that the ratchet teeth 54 will engage ratchet teeth 55 and lock the propeller blades against pitch changing movement in the decrease pitch direction. However, during propeller operation in the manual blade angle control range, full reverse, or in the feathering range above the maximum positive governing pitch angle, the sleeve 25 will have an angular position relative to the hub and the pitch lock element 45 such that the lugs 56 will be aligned with the flange 57. Accordingly, when the propeller is operated in these ranges, the mechanical pitch lock cannot be engaged since the springs 49 can only move the element 45 to a position where the lugs 56 engage the flange 57, in which position the ratchet teeth 54 do not engage the ratchet teeth 55.

With particular reference to Fig. 2, the hydraulic control system for the mechanical pitch lock and mechanical low pitch stop assembly will be described, this system only being shown schematically. Structurally, the hydraulic control system may be disposed in a regulator, not shown, attached to and rotatable with the propeller hub, the hydraulic system being self-contained so that there are no fluid connections between stationary and rotating parts of the propeller assembly.

Schematically, the hydraulic system is shown including a pump 60, which is driven incident to propeller rotation. The pump 60 draws fluid through an intake 61 and discharges it through a check valve 62 to a pressure line 63. The pressure line 63 communicates with a pressure supply passage 64 in a pitch lock and pitch stop valve assembly, generally indicated by numeral 65. The pitch lock and pitch stop of valve assembly 65 includes a housing 66 having valve chambers 67, 68, 69 and 70 therein. A rotary selector valve 71 is disposed within the valve chamber 67, the rotary selector valve being restrained against axial movement by a pin 72 disposed in a groove 73 of the valve 71. In addition, the valve 71 is formed with a porting land 74 having a pair of grooves 75 and 76. In the position indicated in Fig. 2, the groove 75 connects passage 77 to drain through port 78. Pressure fluid from line 63 is supplied through passage 64, the valve chamber 68 and passage 79 to the valve bore 67, flow of pressure fluid to drain from chamber 67 being prevented by land 80 of the valve 71. The valve 71 includes a rod 81, which is attached to a crank arm 82, the crank arm being pivotally connected by a pin 83 to a link 84, which may be moved longitudinally by a control lever 85. When the control lever 85 is moved in a clockwise direction, as viewed in Fig. 2, the valve member 71 will be rotated so as to interconnect the valve chamber 67 with the passage 77.

A servo valve 86 is disposed within the valve chamber 68, the servo valve 86 having spaced lands 87 and 88. The servo valve 86 is normally biased upwardly by a spring 89. When pressure is applied to passage 77, it acts on the upper surface of land 87 so as to move the servo valve 86 downwardly, thereby interconnecting pressure passage 64 with passage 90, which is connected schematically by a line 91 to the pitch stop releasing servo chamber 42. Accordingly, by moving the control lever 85 in a clockwise direction, the valve 71 will be rotated about its longitudinal axis so as to apply pressure fluid to the passage 77 from valve chamber 67 through the grooves 76, thereby moving the servo valve 86 downwardly and applying pressure from passage 64 to passage 90, line 91 and the servo chamber 42 so as to move the pitch stop element 39 to the position shown in Fig. 1. When the pitch stop element 39 is in the position of Fig. 1, the propeller blades 12 can be moved in a decrease pitch direction below the low pitch stop angle of positive 18° to any selected angle in the beta range or to the full reverse position. When the rotary valve 71 is in the position depicted in Fig. 2, the pitch stop servo chamber 42 is connected to drain through line 91, passage 90, and drain passage 119. Under these conditions, the axially movable pitch stop element 39 will be moved to an operative position so that its jaws 40 will engage jaws 29 of the pitch stop element 28 at the selected low pitch stop angle and prevent further movement of the blades in the pitch decrease direction.

The pressure passage 64 of the valve assembly 65 also communicates with valve chamber 69 and is connected by a passage 92 to valve chamber 70. A servo valve 93 is disposed within the valve chamber 69. The valve 93 is formed with spaced lands 94 and 95, and is biased upwardly by a spring 96. The valve chamber 70 encloses a speed sensitive valve assembly 97 for controlling the servo valve 93. The valve assembly 97 includes a sleeve 98 having spaced lands 99, 100 and 101. The sleeve 98 is also formed with a series of ports 102 between lands 99 and 100 and the series of ports 103 between lands 100 and 101. The sleeve 98 is also connected by means of a pin 104 with a crank arm 105 pivoted at 106 to the valve housing 66. The crank arm 105 may be oscillated by any suitable mechanism well known in the art so as to apply jitter, or dither, to the sleeve 98 to increase the sensitivity of the valve assembly 97. The jitter applied to the sleeve 98 imparts a slight reciprocating movement thereto.

A speed sensitive valve element 107 is disposed for reciprocable movement within the sleeve 98. The mass of element 107 responds to centrifugal force in the direction of arrow 108 and is formed with spaced lands 109 and 110. Movement of the valve element 107 due to centrifugal force is opposed by a calibrated spring 111, the inner end of which abuts a flange 112 attached to the valve element 107, and the outer end of which engages the housing 66. The chamber of the spring 111 is connected to drain through passage 113, and a stop 114 is arranged to limit upward movement of the valve element 107, the stop and spring being coaxially arranged.

When the speed of propeller rotation is lower than the speed setting of the valve assembly 97, the force of spring 111 will be greater than the thrust of centrifugal force so that the valve element 107 will assume the position shown in Fig. 2. Under these conditions, the pressure in passage 92 flows through ports 103 to ports 102 to passage 115 and the top of valve chamber 69, thereby acting on the upper surface of land 94 so as to move the servo valve to the position shown in Fig. 2. When the servo valve 93 is in the position of Fig. 2, pressure from passage 64 flows to passage 116, which is connected by a line 117 to the pitch lock releasing servo chamber 52, thereby maintaining the pitch lock element 45 in the position shown in Fig. 1. Thus, during normal propeller operation, the mechanical pitch lock is maintained in a disengaged position by pressure fluid. However, when propeller rotation exceeds the governor speed setting by a predetermined amount, for instance, 5%, the valve element 107 will move upwardly to a position where land 110 will be above ports 102, thereby connecting ports 102 and line 115 to drain through the hollow sleeve 98. Accordingly, the spring 96 will move the servo valve 93 upwardly so as to connect the servo chamber 52 of the pitch lock to drain through line 117, passage 116 and passage 118. Thus, if the propeller is operating in the constant speed range, the springs 49 will move the pitch lock element into engagement with the master gear 20 so as to prevent further movement of the propeller blades in the decrease pitch direction. However, if the propeller is operating in any of the other ranges, i.e. beta, full reverse or feathering, the lugs 56 of the pitch lock element 45 will engage the flange 57 of the sleeve 25 and prevent engagement of the mechanical pitch lock elements.

From the foregoing, it is apparent that the present invention discloses a combined mechanical pitch lock and low pitch stop assembly that cooperates with the pitch coordinating gear of a variable pitch propeller. Moreover, the instant pitch lock and pitch stop assembly utilizes common resilient means to engage both the pitch stop and the pitch lock.

While the embodiment of the present invention as herein disclosed, constitutes a preferred form, it is to be understood that other forms might be adopted.

What is claimed is as follows:

1. A combined mechanical pitch lock and low pitch stop assembly for a variable pitch propeller having a hub with a plurality of propeller blades journaled therein for rotation about their longtiudinal axes and pitch changing means operatively connected to the blades for varying the pitch position thereof, including in combination, means operatively connected to all of the propeller blades and rotatable about the horizontal propeller axis, said means having a definite angular position for every pitch position of the propeller blades, releasable stop means engageable with said first recited means at a predetermined angle for preventing rotation of said first recited means and the propeller blades in a decrease pitch direction, releasable lock means engageable with said first recited means for preventing rotation of the said first recited means and the propeller blades in the decrease pitch direction, and single spring means for engaging said stop means and said lock means.

2. A combined mechanical pitch lock and low pitch stop assembly for a variable pitch propeller having a hub with a plurality of propeller blades journaled therein for rotation about their longitudinal axes and pitch changing means operatively connected to the blades for varying the pitch position thereof, including in combination, means operatively connected to all of the propeller blades and rotatable about the horizontal propeller axis, said means having a definite angular position for every pitch position of the propeller blades, stop means engageable with said first recited means at a predetermined angle for preventing rotation of said first recited means and the propeller blades in a decrease pitch direction, lock means engageable with said first recited means for preventing rotation of the said first recited means and the propeller blades in the decrease pitch direction, and single spring means for engaging said stop means and said lock means.

3. A combined mechanical pitch lock and low pitch stop assembly for a variable pitch propeller having a hub with a plurality of propeller blades journaled therein for rotation about their longitudinal axes and pitch changing means operatively connected to the blades for varying the pitch position thereof, including in combination, means operatively connected to all of the propeller blades and rotatable about the horizontal propeller axis, said means having a definite angular position for every pitch position of the propeller blades, stop means engageable with said first recited means at a predetermined angle for preventing rotation of said first recited means and the propeller blades in a decrease pitch direction, fluid pressure operated means for disengaging said stop means to permit rotation of said first recited means and the propeller blades in the decrease pitch direction below said predetermined angle, lock means engageable with said first recited means for preventing rotation of the said first recited means and the propeller blades in the decrease pitch direction, and single spring means for engaging said stop means and said lock means.

4. A combined mechanical pitch lock and low pitch stop assembly for a variable pitch propeller having a hub with a plurality of propeller blades journaled therein for rotation about their longitudinal axes and pitch changing means operatively connected to the blades for varying the pitch position thereof, including in combination, means operatively connected to all of the propeller blades and rotatable about the horizontal propeller axis, said means having a definite angular position for every pitch position of the propeller blades, stop means engageable with said first recited means at a predetermined angle for preventing rotation of said first recited means and the propeller blades in a decrease pitch direction, lock means engageable with said first recited means for preventing rotation of the said first recited means and the propeller blades in the decrease pitch direction, lock means engageable with said first recited means for preventing rotation of the said first recited means and the propeller blades in the decrease pitch direction, fluid pressure means for normally maintaining said lock means disengaged to permit rotation of said first recited means and the propeller blades in the decrease pitch direction, and single spring means for engaging said stop means and said lock means.

5. A combined mechanical pitch lock and low pitch stop assembly for a variable pitch propeller having a hub with a plurality of propeller blades journaled therein for rotation about their longitudinal axes and pitch changing means operatively connected to the blades for varying the pitch position thereof, including in combination, means operatively connected to all of the propeller blades and rotatable about the horizontal propeller axis, said means having a definite angular position for every pitch position of the propeller blades, stop means engageable with said first recited means at a predetermined angle for preventing rotation of said first recited means and the propeller blades in a decrease pitch direction, fluid pressure operated means for disengaging said stop means to permit rotation of said first recited means and the propeller blades in the decrease pitch direction below said predetermined angle, lock means engageable with said first recited means for preventing rotation of the said first recited means and the propeller blades in the decrease pitch direction, fluid pressure means for normally maintaining said lock means disengaged to permit rotation of said first recited means and the propeller blades in the decrease pitch direction, and single spring means for engaging said stop means and said lock means.

6. A combined mechanical pitch lock and low pitch stop assembly for a variable pitch propeller having a hub with a plurality of propeller blades journaled therein for rotation about their longitudinal axes and pitch changing means operatively connected to the blades for varying the pitch position thereof, including in combination, a master gear connected to all of the propeller blades and rotatable about the horizontal propeller axis for coordinating the pitch changing movements of said blades, a sleeve connected to rotate with said master gear, said master gear and said sleeve having a definite angular position for every pitch position of the propeller blades, releasable stop means engageable with said sleeve at a predetermined angle for preventing rotation of said sleeve, said master gear and the propeller blades in a decrease pitch direction, releasable lock means engageable with said master gear for preventing rotation of the master gear and the propeller blades in the decrease pitch direction, and single spring means for engaging said stop means and said lock means.

7. A combined mechanical pitch lock and low pitch stop assembly for a variable pitch propeller having a hub with a plurality of propeller blades journaled therein for rotation about their longitudinal axes and pitch changing means operatively connected to the blades for varying the pitch position thereof, including in combination, a master gear connected to all of the propeller blades and rotatable about the horizontal propeller axis for coordinating the pitch changing movements of said blades, a sleeve connected to rotate with said master gear, said master gear and said sleeve having a definite angular position for every pitch position of the propeller blades, stop means engageable with said sleeve at a predetermined angle for preventing rotation of said sleeve, said master gear and the propeller blades in a decrease pitch direction, lock means engageable with said master gear for preventing rotation of the master gear and the propeller blades in the decrease pitch direction, and single spring means for engaging said stop means and said lock means.

8. A combined mechanical pitch lock and low pitch stop assembly for a variable pitch propeller having a hub with a plurality of propeller blades journaled therein for rotation about the longitudinal axes and pitch changing means operatively connected to the blades for varying the pitch position thereof, including in combination, a master gear connected to all of the propeller blades and rotatable about the horizontal propeller axis for coordinating the pitch changing movements of said blades, a sleeve connected to rotate with said master gear, said master gear and said sleeve having a definite angular position for every pitch position of the propeller blades, stop means engageable with said sleeve at a predetermined angle for preventing rotation of said sleeve, said master gear and the propeller blades in a decrease pitch direction, fluid pressure operated means for disengaging said stop means to permit rotation of said sleeve, said master gear and the propeller blades in the decrease pitch direction below said predetermined angle, lock means engageable with said master gear for preventing rotation of the master gear and the propeller blades in the decrease pitch direction, and single spring means for engaging said stop means and said lock means.

9. A combined mechanical pitch lock and low pitch stop assembly for a variable pitch propeller having a hub with a plurality of propeller blades journaled therein for rotation about their longitudinal axes and pitch changing means operatively connected to the blades for varying the pitch position thereof, including in combination, a master gear connected to all of the propeller blades and rotatable about the horizontal propeller axis for coordinating the pitch changing movements of said blades, a sleeve connected to rotate with said master gear, said master gear and said sleeve having a definite angular position for every pitch position of the propeller blades, stop means engageable with said sleeve at a predetermined angle for preventing rotation of said sleeve, said master gear and the propeller blades in a decrease pitch direction, lock means engageable with said master gear for preventing rotation of the master gear and the propeller blades in the decrease pitch direction, fluid pressure operated means for disengaging said lock means to permit rotation of said master gear and said propeller blades in the decrease pitch direction, and single spring means for engaging said stop means and said lock means.

10. A combined mechanical pitch lock and low pitch stop assembly for a variable pitch propeller having a hub with a plurality of propeller blades journaled therein for rotation about their longitudinal axes and pitch changing means operatively connected to the blades for varying the pitch position thereof, including in combination, a master gear connected to all of the propeller blades and rotatable about the horizontal propeller axis for coordinating the pitch changing movements of said blades, a sleeve connected to rotate with said master gear, said master gear and said sleeve having a definite angular position for every pitch position of the propeller blades, stop means engageable with said sleeve at a predetermined angle for preventing rotation of said sleeve, said master gear and the propeller blades in a decrease pitch direction, fluid pressure operated means for disengaging said stop means to permit rotation of said sleeve, said master gear and the propeller blades in the decrease pitch direction below said predetermined angle, lock means engageable with said master gear for preventing rotation of the master gear and the propeller blades in the decrease pitch direction, fluid pressure operated means for disengaging said lock means to permit rotation of said master gear and the propeller blades in the decrease pitch direction, and single spring means for engaging said stop means and said lock means.

11. A combined mechanical pitch lock and low pitch stop assembly for a variable pitch propeller having a hub with a plurality of propeller blades journaled therein for rotation about their longitudinal axes and pitch changing means operatively connected to the blades for varying the pitch position thereof, including in combination, means operatively connected to all of the propeller blades and rotatable about the horizontal propeller axis, said means having a definite angular position for every pitch position of the propeller blades, stop means engageable with said first recited means at a predetermined angle for preventing rotation of said first recited means and the propeller blades in a decrease pitch direction, said stop means including cooperating jaw elements engageable in one direction, one of said stop elements being connected to said first recited means and rotatable with respect to the hub during pitch changing movements of the blades and the other of said stop elements being fixed against rotation relative to the hub, lock means engageable with said first recited means for preventing rotation of the said first recited means and the propeller blades in the decrease pitch direction, and single spring means for engaging said stop means and said lock means.

12. A combined mechanical pitch lock and low pitch stop assembly for a variable pitch propeller having a hub with a plurality of propeller blades journaled therein for rotation about their longitudinal axes and pitch changing means operatively connected to the blades for varying the pitch position thereof, including in combination, means operatively connected to all of the propeller blades and rotatable about the horizontal propeller axis, said means having a definite angular position for every pitch position of the propeller blades, stop means engageable with said first recited means at a predetermined angle for preventing rotation of said first recited means and the propeller blades in a decrease pitch direction, lock means engageable with said first recited means for preventing rotation of the said first recited means and the propeller blades in the decrease pitch direction, said lock means including cooperating ratchet elements engageable in the decrease pitch direction, one of said lock elements being connected to said first recited means to rotate with respect to the hub during pitch changing movements of the blades and the other of said lock elements being fixed against rotation relative to the hub, and single spring means for engaging said stop means and said lock means.

13. A combined mechanical pitch lock and low pitch stop assembly for a variable pitch propeller having a hub with a plurality of propeller blades journaled therein for rotation about their longitudinal axes and pitch changing means operatively connected to the blades for varying the pitch position thereof, including in combination, means operatively connected to all of the propeller blades and rotatable about the horizontal propeller axis, said means having a definite angular position for every pitch position of the propeller blades, stop means engageable with said first recited means at a predetermined angle for preventing rotation of said first recited means and the propeller blades in a decrease pitch direction, said stop means including cooperating jaw elements engageable in the decrease pitch direction, one of said stop elements being connected to said first recited means to rotate with respect to the hub during pitch changing movements of the blades and the other of said stop elements being fixed against rotation relative to the hub, lock means engageable with said first recited means for preventing rotation of the first recited means and the propeller blades in the decrease pitch direction, said lock means including cooperating ratchet elements engageable in the decrease pitch direction, one of said lock elements being connected to said first recited means to rotate with respect to the hub during pitch changing movements of the blades and the other of said lock elements being fixed against rotation relative to the hub, said stop element and said lock element which are fixed against rotation relative to the hub being axially movable relative to the hub, and common resilient means engaging said axially movable stop element and lock element for moving them into an operative position with respect to their respective stop and lock elements which rotate relative to the hub during pitch changing movements of the blades.

14. The combination set forth in claim 13 including fluid pressure operated means connected to said axially movable stop element for moving it out of engagement with its cooperating stop element.

15. The combination set forth in claim 13 including fluid pressure operated means connected to said axially movable lock element for moving it out of engagement with its cooperating lock element.

16. In a propeller having a hub, a plurality of blades mounted for pitch changing movement in said hub, means for varying the pitch position of said blades, the combination of lock means including cooperating ratchet elements engageable in one direction, one of said elements being rotatable with respect to said hub during pitch changing movements of the blades and the other of said elements being fixed against rotation relative to the hub, a source of fluid pressure, means including fluid connections from said source to said lock means for maintaining said elements in disengaged position, said last recited means including a speed sensitive valve connected to said source and a servo valve connected to said source and said lock means, said speed sensitive valve having connection with said servo valve for normally maintaining said servo valve in position to maintain said lock means in the disengaged position, said speed sensitive valve being movable to interrupt said connection between the speed sensitive valve and the servo valve upon a predetermined propeller overspeed, and means responsive to a predetermined reduction in the pressure of the fluid acting on said lock means for engaging said elements.

References Cited in the file of this patent

UNITED STATES PATENTS

| | | |
|---|---|---|
| 2,392,364 | Caldwell et al. | Jan. 8, 1946 |
| 2,609,057 | Crowhurst | Sept. 2, 1952 |
| 2,703,148 | Pearl | Mar. 1, 1955 |